S. B. MOTT.
LIQUID METER.
APPLICATION FILED SEPT. 27, 1919.
1,372,768.
Patented Mar. 29, 1921.
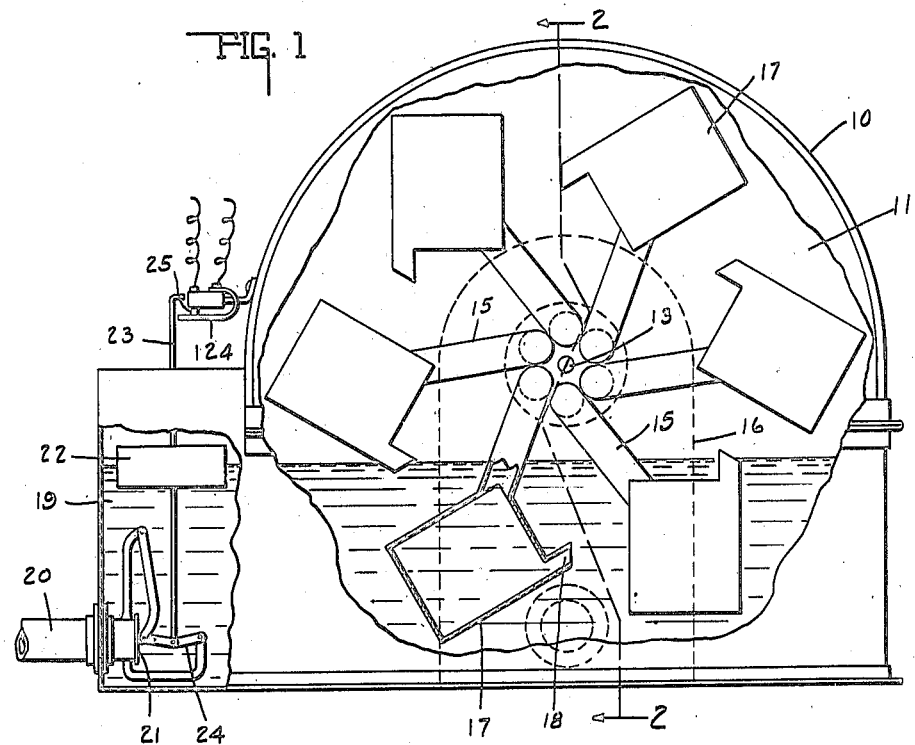
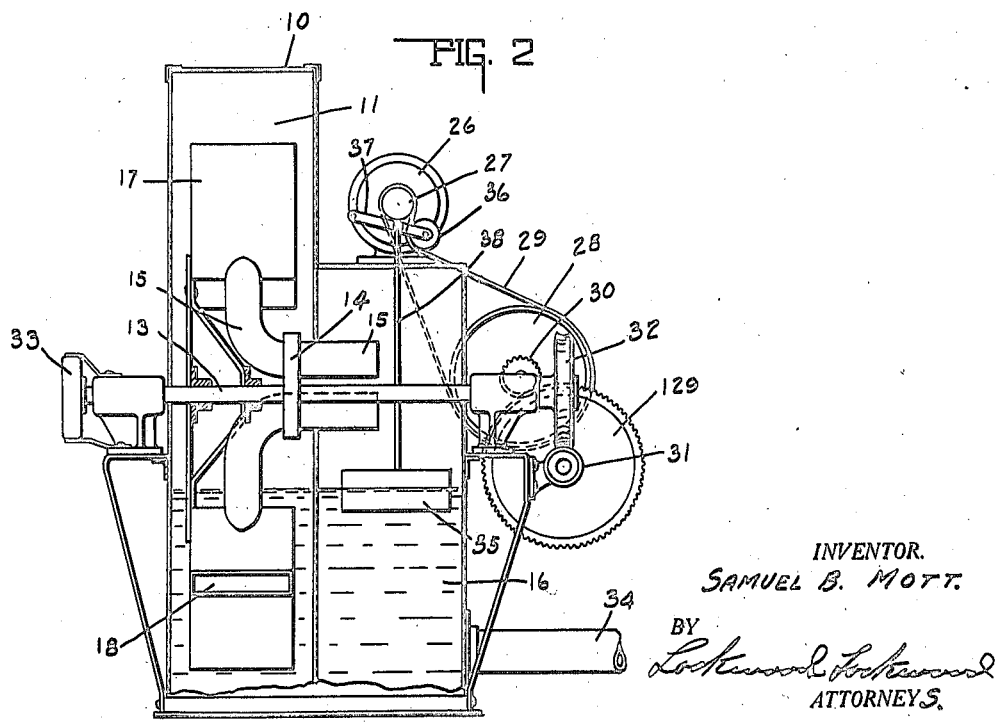
INVENTOR.
SAMUEL B. MOTT.
BY
*Lockwood Lockwood*
ATTORNEYS.

UNITED STATES PATENT OFFICE.

SAMUEL B. MOTT, OF NOBLESVILLE, INDIANA.

LIQUID-METER.

1,372,768.                Specification of Letters Patent.        Patented Mar. 29, 1921.

Application filed September 27, 1919. Serial No. 326,713.

*To all whom it may concern:*

Be it known that I, SAMUEL B. MOTT, a citizen of the United States, and a resident of Noblesville, county of Hamilton, and State of Indiana, have invented a certain new and useful Liquid-Meter; and I do hereby declare that the following is a full, clear, and exact description thereof, reference being had to the accompanying drawings, in which like numerals refer to like parts.

This invention relates to a liquid meter for measuring a liquid fed to boilers, turbines, pumping stations and the like, or for any liquid system wherein it is desired to accurately measure the amount of liquid supplied thereto.

While there are several different types of liquid meters, they do not accurately measure the liquid, as is desired for some purposes, and it is therefore the main object of this invention to construct a liquid meter which will measure the liquid supplied to a high degree of accuracy. This is accomplished by introducing the liquid into a supply chamber from containers of known capacity, and recording the number of containers filled with liquid delivered into the supply chamber.

Another feature of the invention is the automatic control of the feeding containers whereby the rapidity of their operation will be increased or decreased so as to supply a greater or lesser amount of water, depending upon the supply used from the supply tank and also stopping the operation of the containers so that further recording will not take place should the supply of liquid to the containers fail, all of which will be hereinafter more fully shown and described.

The full nature of this invention will be understood from the accompanying drawings and the following description and claims.

In the drawings Figure 1 is a side elevation of the liquid meter having portions thereof broken away. Fig. 2 is a cross section taken on the line 2—2 of Fig. 1.

In the drawings there is shown a liquid meter having a housing 10 inclosing a water tight chamber 11. Extending centrally through the housing there is a shaft 13 mounted in proper bearings thereon, upon which is secured a supporting disk 14 in which a plurality of discharge conduits 15 are mounted and rigidly secured. The conduits 15 extend laterally through an opening in the side wall of the housing into a liquid supply chamber 16 for discharging the liquid passing through said conduits therein. As shown in the drawings there are six of these conduits which are carried by, and revolve with, the disk 14 as the shaft 13 is driven, and have their inlet ends curved radially in the chamber 11 and fixedly secured to the measuring containers or buckets 17 for carrying the containers around the shaft 13 in the chamber 11 and draining their contents as they are carried into inverted position. The containers 17 are provided with mouths 18 through which the liquid will pass for filling the container as it is passed therethrough.

Adjacent the housing 10 and in direct communication with the chamber 11 there is a float chamber 19 into which the liquid supply pipe 20 discharges, the discharge of the liquid therefrom being controlled by a valve 21 which is in turn controlled by a float 22 mounted on a rod 23. The valve 21 may be controlled by the elevation of the float 22 in any suitable manner, such as is shown herein by the links 24 being depressed by the rod 23 as the float descends below the desired level of the liquid, causing the valve 21 to be pulled away from the discharge opening of the supply pipe 20, and likewise as the float is elevated to the desired level and beyond, the links 24 are elevated so as to force the valve 20 into closed position. In order to stop the operation of the meter, should the water supply fail or the liquid contained in the chamber 11 fall below a level such as would cause the improper measuring thereof, the current of electricity necessary for operating the meter, as will be hereinafter described, is cut out when the float 22 drops with the level of the liquid by means of the upper end of the rod 23 engaging the spring switch 124 and pulling it down out of contact with the terminal 25, thereby breaking the circuit and stopping the further operation of the meter so that it will not inaccurately record the liquid supply.

The meter is driven and operated by an electric motor 26 driven from any suitable source of supply through the switch 124. The motor 26 is provided with a pulley 27 which drives the pulley wheel 28 through the belt 29. The driving ratio is further reduced by the pulley 28 driving the sprocket wheel 129 through the pinion 30 secured on said pulley, said sprocket wheel driving a worm 31 which meshes with a worm gear 32 mounted upon the shaft 13. The shaft 13 causes the measuring containers 17 to revolve for dipping out the liquid maintained at a constant level in the chamber 11, by means of the float 22 and valve connected therewith, each revolution of which is recorded by a counter 33 so that the total number of revolutions, and therefore the total number of containers filled with liquid, may be registered.

The amount of liquid supplied to the supply chamber 16 depends upon the speed at which the motor is driven, from which the liquid passes to the boiler, tank or the like through the discharge pipe 34. Therefore the amount of liquid to be dispensed must be controlled through the speed of rotation, for which purpose there is provided a float 35 in the chamber 15 which controls a tension pulley 36 mounted on the lever 37 and controlled by the rod 38, said tension pulley engaging the belt 29 for controlling its tautness to the pulleys 27 and 28 and thereby causing the motor to be driven at maximum speed when the liquid supply is low, and at a minimum speed, or entirely stopped, when the supply is above the proper level.

As the meter revolves, assuming that the liquid contained in the chamber is at the normal level as controlled by the float 22, the containers or buckets 17 dip down under the level of the liquid, which flows therein through the mouth 18 so as to completely fill the buckets to their capacity, driving the air therein out through the conduits 15. When carried out of the liquid the mouth of the bucket is above the surface so that no more liquid can enter therein before it is in position to discharge the liquid through the conduit. During the further revolution thereof the bucket is upset so that the liquid contents thereof is discharged down through the conduit and into the chamber 16. Therefore the operation of the meter is such that a very definite and accurately measured amount of liquid will be discharged into the supply chamber, measured by the amount of liquid in a single bucket or container, times the number of containers discharged in one revolution, times the number of revolutions recorded upon the counter 33. If exact accuracy is desired the counter 33 can indicate fractions, depending upon the number of buckets in the meter. To measure the amount of liquid fed through the meter in pounds it need only be known the number of pounds of liquid contained in the definite number of buckets, and multiply this figure by the difference in the number of revolutions recorded upon the counter.

The invention claimed is:

1. A liquid meter for accurately and definitely measuring the amount of liquid dispensed therethrough, including a container for containing and dispensing a known quantity of liquid, means for regulating the proper amount of liquid supplied by said container, and means for regulating the number of times the containing means dispenses the liquid therefrom.

2. A liquid meter for accurately and definitely measuring the amount of liquid dispensed therethrough, including a container for containing and dispensing a known quantity of liquid, means for operating said container, means for controlling the operation thereof according to the amount of liquid to be dispensed, means for regulating the proper amount of liquid supplied by said container, and means for regulating the number of times the containing means dispenses the liquid therefrom.

3. A liquid meter for accurately and definitely measuring the amount of liquid dispensed therethrough, including a liquid chamber, a plurality of buckets in said chamber, discharge conduits secured to said buckets and extending to a common center, means for revolving said conduits for revolving said buckets whereby a definite amount of liquid in said chamber will be dispensed by each of said buckets through said conduits as they are revolved therein, and means for regulating the number of revolutions said buckets make within said chamber for measuring the amount of liquid dispensed thereby.

4. A liquid meter for accurately and definitely measuring the amount of liquid dispensed therethrough, including a liquid chamber, a plurality of buckets in said chamber, discharge conduits secured to said buckets and extending to a common center, means for revolving said conduits for revolving said buckets whereby a definite amount of liquid in said chamber will be dispensed by each of said buckets through said conduits as they are revolved therein, and means for controlling the revolving means of said buckets for discontinuing the same when the liquid dispensed therefrom has reached a given amount.

5. A liquid meter for accurately and definitely measuring the amount of liquid dispensed therethrough, including a liquid chamber, a plurality of buckets in said chamber, discharge conduits secured to said buckets and extending to a common center, means for revolving said conduits for revolving said buckets whereby a definite amount of liquid in said chamber will be dispensed by each of said buckets through said conduits as they are revolved therein, means for regulating the number of revolutions said buckets make within said chamber for measuring the amount of liquid dispensed thereby, and means for stopping the operation of said meter when the water supply thereof falls below the proper level.

In witness whereof, I have hereunto affixed my signature.

SAMUEL B. MOTT.